United States Patent
Takahashi et al.

(10) Patent No.: US 10,333,371 B2
(45) Date of Patent: Jun. 25, 2019

(54) STATOR AND ROTATING ELECTRIC MACHINE INCLUDING THE SAME

(71) Applicant: DENSO CORPORATION, Kariya, Aichi-pref. (JP)

(72) Inventors: Yuki Takahashi, Obu (JP); Hideaki Suzuki, Toyoake (JP); Masahiro Seguchi, Obu (JP)

(73) Assignee: DENSO CORPORATION, Kariya (JP)

(*) Notice: Subject to any disclaimer, the term of this patent is extended or adjusted under 35 U.S.C. 154(b) by 185 days.

(21) Appl. No.: 14/147,631

(22) Filed: Jan. 6, 2014

(65) Prior Publication Data

US 2014/0191629 A1 Jul. 10, 2014

(30) Foreign Application Priority Data

Jan. 9, 2013 (JP) .................................. 2013-001719

(51) Int. Cl.
*H02K 11/25* (2016.01)
*H02K 3/34* (2006.01)
(Continued)

(52) U.S. Cl.
CPC ............. *H02K 11/25* (2016.01); *H02K 3/34* (2013.01); *H02K 3/48* (2013.01); *H02K 11/00* (2013.01);
(Continued)

(58) Field of Classification Search
CPC ..... H02K 11/00–048; H02K 3/00–528; H02K 2213/00–12; H02K 1/14;
(Continued)

(56) References Cited

U.S. PATENT DOCUMENTS 2,717,945 A * 9/1955 Briggs ..................... G01K 7/18
310/67 R
4,676,665 A * 6/1987 Twerdochlib .......... G01K 11/02
374/117
(Continued)

FOREIGN PATENT DOCUMENTS

JP          05-137298        6/1993
JP         05137298 A    *  6/1993
(Continued)

OTHER PUBLICATIONS

Warabino Mitsutoshi, Protecting Device for Temperature Measuring Element of Electric Rotating Machine, Jun. 6, 1993, Fuji Electric, JP 05137298 (English Machine Translation).*

(Continued)

*Primary Examiner* — Bernard Rojas
*Assistant Examiner* — Alexander A Singh
(74) *Attorney, Agent, or Firm* — Nixon & Vanderhye P.C.

(57) ABSTRACT

A stator includes a stator core, a winding, and a temperature sensor. In the stator core, a plurality of slots are formed in a circumferential direction of the stator. The winding is formed by a plurality of conductors which are housed in the slots and are electrically connected. The slots are formed such that a predetermined number of the conductors are housed and arrayed in a radial direction of the stator. The temperature sensor is located in at least one of the slots and detects temperature of the conductors.

4 Claims, 10 Drawing Sheets

(51) Int. Cl.
*H02K 3/48* (2006.01)
*H02K 11/20* (2016.01)
*H02K 11/00* (2016.01)

(52) U.S. Cl.
CPC .............. *H02K 11/20* (2016.01); *H02K 3/345* (2013.01); *H02K 2213/03* (2013.01)

(58) Field of Classification Search
CPC .......... H02K 1/12; H02K 1/141; H02K 1/143; H02K 1/145; H02K 1/146; H02K 1/148
USPC ................ 310/68 A, 68 B, 68 C, 68 D, 68 E
See application file for complete search history.

(56) References Cited

U.S. PATENT DOCUMENTS

| | | | | |
|---|---|---|---|---|
| 2002/0167232 | A1* | 11/2002 | Randall | H02K 1/145 310/261.1 |
| 2009/0140614 | A1* | 6/2009 | Heim | H02K 11/0047 310/68 C |
| 2011/0241458 | A1* | 10/2011 | Rai | G01K 13/02 310/53 |
| 2012/0146563 | A1* | 6/2012 | Zettner | G01J 5/00 318/473 |
| 2013/0156071 | A1* | 6/2013 | Wan | H02K 3/345 374/183 |

FOREIGN PATENT DOCUMENTS

| | | |
|---|---|---|
| JP | 06-070510 | 3/1994 |
| JP | 08080011 A * | 3/1996 |
| JP | 11-164504 | 6/1999 |
| JP | 2006-340409 | 12/2006 |
| JP | 2007-110899 | 4/2007 |
| JP | 2010-226861 | 10/2010 |
| JP | 2011-223673 | 11/2011 |
| WO | WO 2012/077215 | 6/2012 |

OTHER PUBLICATIONS

Niikura Hitoshi, Temperature Detecting Device for Winding of Electric Rotary Machine, Mar. 22, 1996, Fuji Electric, JP 08080011 (English Machine Translation).*

Office Action (3 pages) dated Feb. 18, 2016, issued in corresponding Japanese Application No. 2013-001719 and English translation (3 pages).

* cited by examiner

FIG.1

D1: AXIAL DIRECTION
D2: RADIAL DIRECTION

FIG.2

D3: CIRCUMFERENTIAL DIRECTION

STATOR AND ROTATING ELECTRIC MACHINE INCLUDING THE SAME

CROSS-REFERENCE TO RELATED APPLICATION

This application is based on and claims the benefit of priority from earlier Japanese Patent Application No. 2013-001719 filed on Jan. 9, 2013, the description of which is incorporated herein by reference.

BACKGROUND

Technical Field

The present invention relates to a stator capable of performing accurate temperature detection of a coil winding and a rotating electric machine including the stator.

Related Art

In a rotating electric machine, a coil winding is provided on a stator or a rotor. An electric current flows to the coil winding, when the rotating electric machine is driven. As a result, a conductor of the coil winding generates heat based on the electrical resistance of the conductor, and then temperature of the coil winding rises. Therefore, a technique is disclosed in which a temperature sensor is provided in the coil winding to detect the temperature (for example, refer to JP-A-2011-223673).

However, in the technique disclosed in JP-A-2011-223673, the temperature sensor is provided at a coil end of the stator. Therefore, because of the effects of drafts of cooling air and the like, a temperature that is lower than the actual coil temperature is detected. As a result, a problem occurs in that the actual temperature of the rotating electric machine cannot be known.

SUMMARY

It is thus desired to provide a stator that has a configuration enabling accurate temperature detection of a coil winding.

An exemplary embodiment provides a stator including: a stator core in which a plurality of slots are formed in a circumferential direction of the stator; a winding that is formed by a plurality of conductors which are housed in the slots and are electrically connected, the slots being formed such that a predetermined number of the conductors are housed and arrayed in a radial direction of the stator; and a temperature sensor that is located in at least one of the slots and detects temperature of the conductors.

According to this configuration, the slots of the stator are formed such that the conductors are housed and arrayed. The temperature sensor is included that is located within at least one of the slots. Therefore, an excellent effect can be achieved in that the temperature of the conductors can be accurately detected by the temperature sensor located in the slots, without being affected by drafts of cooling air and the like.

DESCRIPTION OF EMBODIMENTS

Hereinafter, embodiments of the present invention will be described with reference to the drawings. In the drawings of the present specification, sections that correspond to each other are given the same reference number. Redundant descriptions are hereafter omitted as appropriate.

First Embodiment

Figure 1:
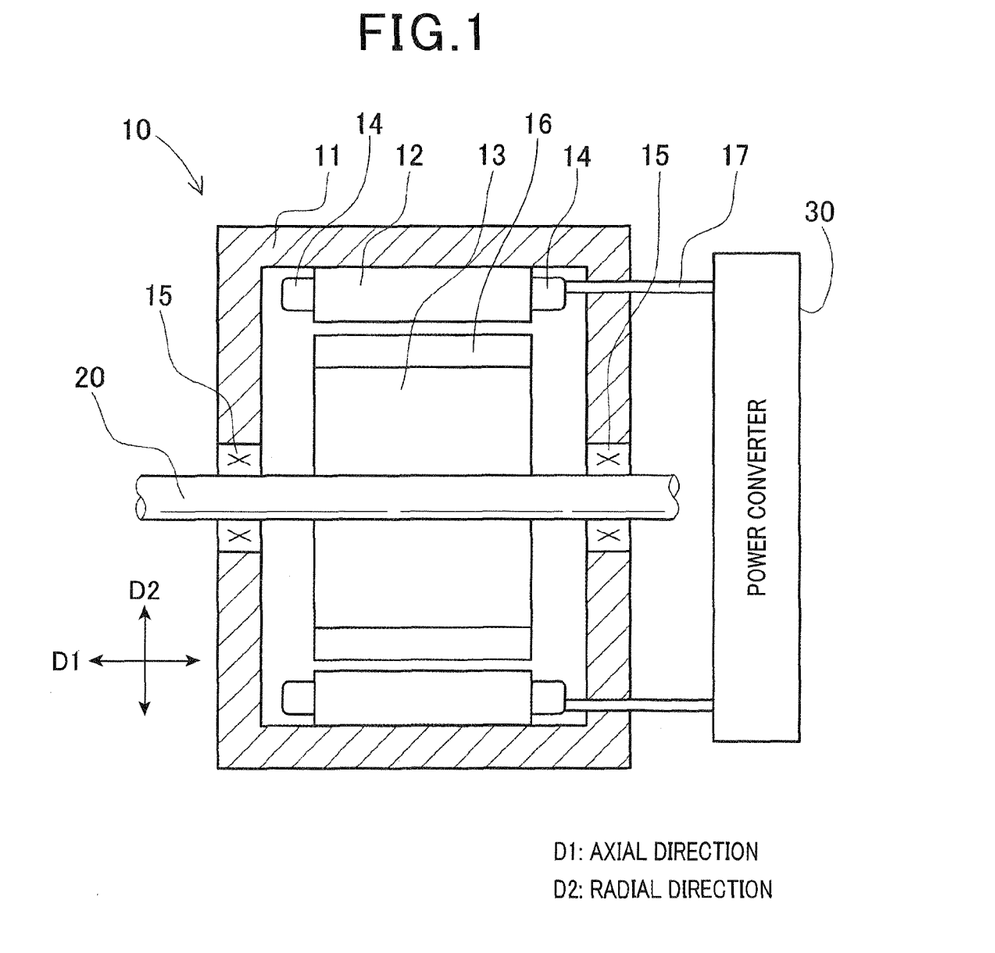
FIG. 1 is a cross-sectional view schematically showing an example of a configuration of a rotating electric machine according to a first embodiment.

A rotating electric machine 10 shown in FIG. 1 is an example of an inner-rotor motor generator. In the rotating electric machine 10, a stator 12, a rotor 13, a rotating shaft 20, and the like are provided within a case member 11. An input/output line 17 and the like connect the rotating electric machine 10 and a power converter 30.

The case member 11 of the rotating electric machine 10 and a case member of the power converter 30 are formed separately and fixed to each other by a fixing means. Alternatively, the case member 11 of the rotating electric machine 10 and the case member of the power converter 30 are integrally formed. The fixing means in the former instance is, for example, nuts and bolts, male and female screws, through-holes and split pins, joining by welding and the like, or crimping of end pieces. Two or more of the fixing means may be selected accordingly and used in combination to fix the case member 11 of the rotating electric machine 10 and the case member of the power converter 30 to each other. The input/output line 17 may be an extension of a conductor 18, described hereafter.

The rotating shaft 20 is supported in a rotatable manner by the case member 11 via a bearing 15 therebetween. The rotating shaft 20 is fixed to a center portion of the rotor 13 by the above-described fixing means. Alternatively, the rotating shaft 20 and the rotor 13 are integrally formed. In both instances, the rotating shaft 20 and the rotor 13 rotate in cooperation. A plurality of permanent magnets 16 are provided in a plurality of magnetic pole positions on an outer diameter surface of the rotor 13.

Figure 2:
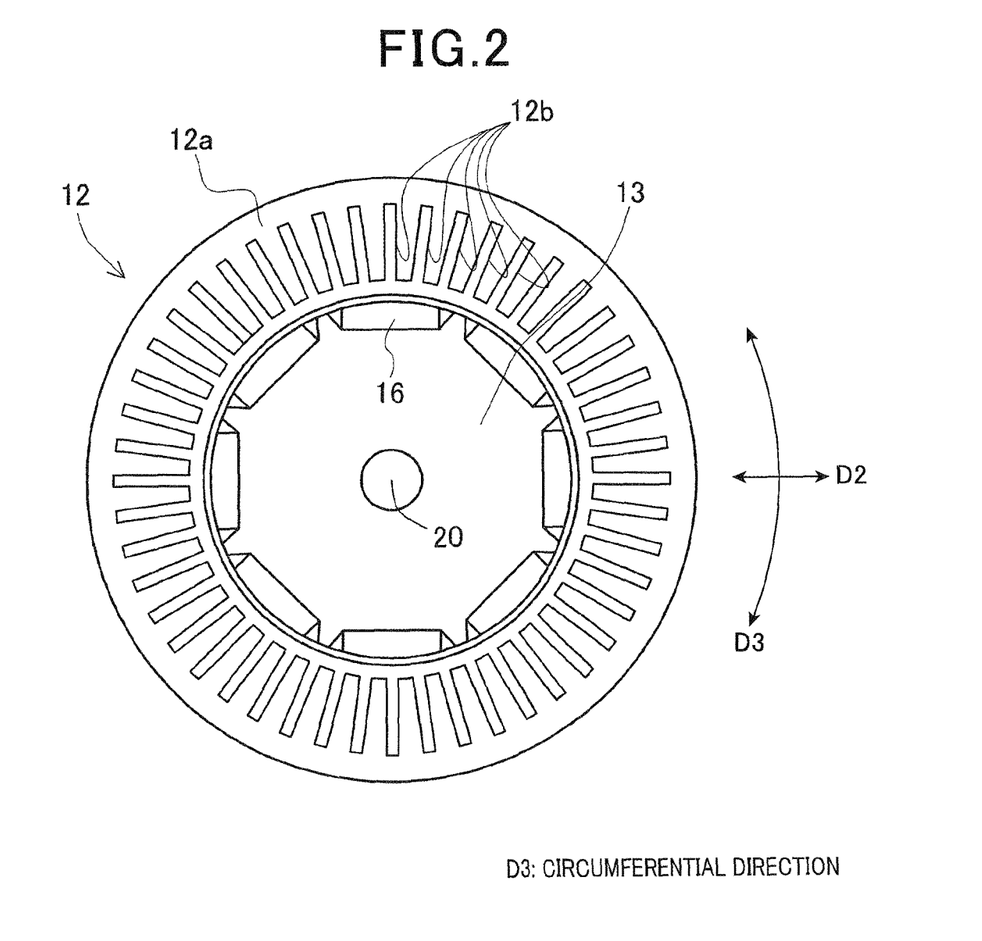
FIG. 2 is a planar view schematically showing an example of a configuration of a stator.

The stator 12 is formed into a circular cylindrical shape. An inner diameter surface of the stator 12 is disposed so as to oppose the outer diameter surface of the rotor 13. As shown in FIG. 2, the stator 12 has a stator core 12a in which a plurality of slots 12b are formed in a radial direction D2 and are arranged at a predetermined interval in a circumferential direction D3. The stator 12 is fixed to the case member 11 by the above-described fixing means. The predetermined interval for placement of the slots 12b may be set to any interval. However, the slots 12b are preferably disposed so as to be evenly spaced in terms of equalizing flow of magnetic flux and increasing torque. Teeth 12d are formed between the slots 12b.

The slots 12b in FIG. 2 are of an example in which a slot multiple S (S being a positive integer) is two. The number of magnetic poles Mn (Mn being a positive integer) is eight. The number of phases p (p being a positive integer) is three phases. The number of slots 12b (number of slots Sn) in this example is Sn=S×Mn×p=2×8×3=48.

Figure 5:
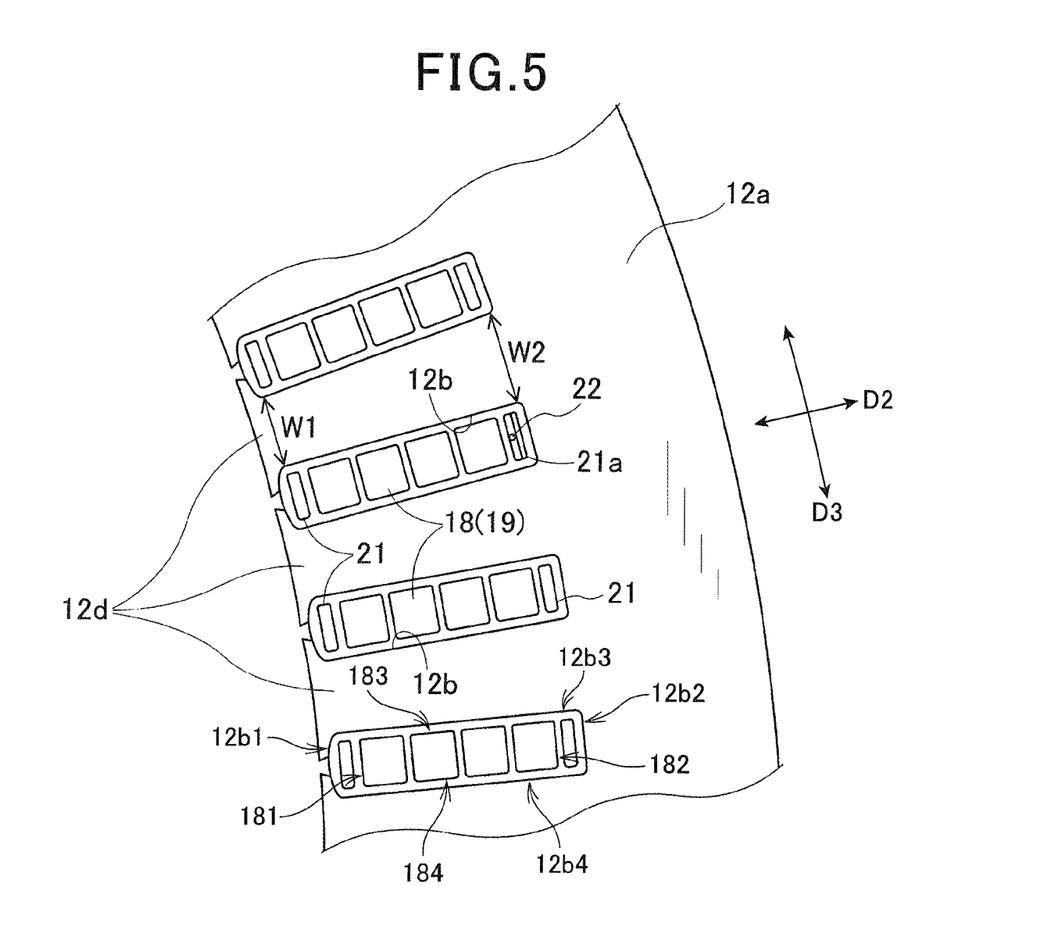
FIG. 5 is a detailed planar view showing a portion of the stator according to the first embodiment.

A plurality of conductors 18 are housed in the slots 12b. The conductors 18 configure a winding (coil winding). For example, as shown in FIG. 5, a predetermined number of the plurality of conductors 18 (four conductors 18 in the present example) are housed in a single slot 12b so as to be stacked and arrayed in a radial direction D2. A portion of each of the conductors 18 that projects in an axial direction D1 from an end surface of each of the slots 12b in the stator core 12a is a turn portion 14 (see FIG. 3). The overall turn portion 14 may also be referred to as a coil end portion. As shown in FIG. 1, a portion of the turn portion 14 is extended and connected to the power converter 30 as a lead.

Figure 3:
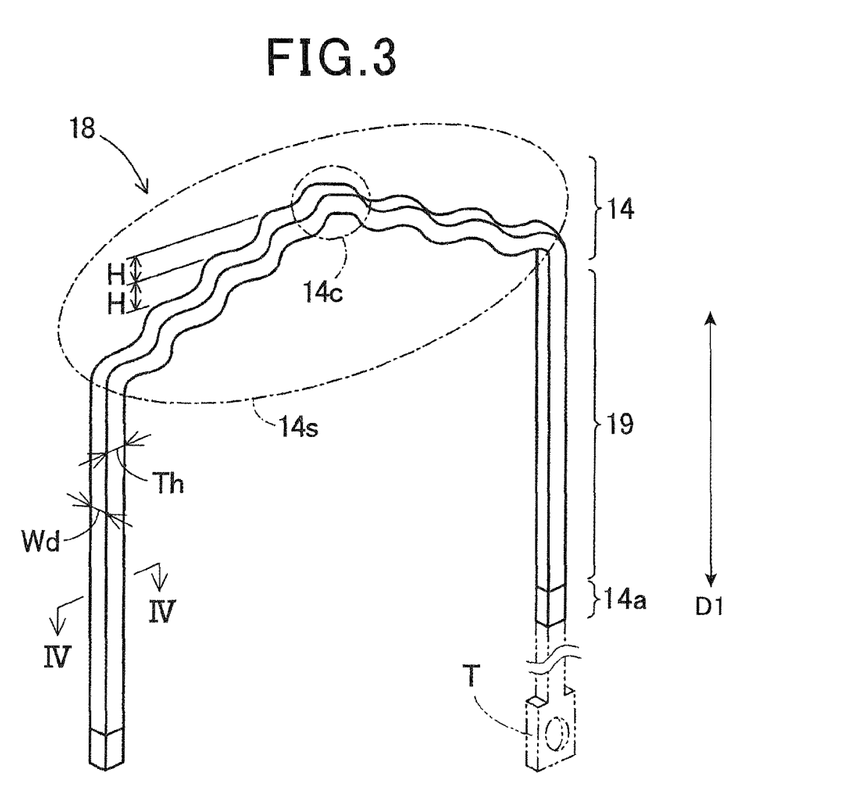
FIG. 3 is a perspective view of an example of a configuration of a conductor.

As shown in FIG. 3, each of the conductors 18 is formed into a U-shape, and has the turn portion 14, slot-housed portions 19, end portions 14a, and the like. A stepped portion 14s is formed in the turn portion 14. The stepped portion 14s is formed into a stepped shape having a plurality of steps. The height H of a single step in the stepped portion 14s may be set to any height. If the height H is set to be substantially equal to the height of the conductor 18 (in other words, a thickness Th), the conductors 18 can be more easily stacked in the radial direction D2. The number of steps in the stepped portion 14s may be set to any number. For example, the number of steps may be set based on the width between the slot-housed portions 19. A crank portion 14c is formed in a center portion of the stepped portion 14s.

The crank portion 14c is bent into a crank shape and provided to shift the conductor 18 in the radial direction D2. The crank portion 14c is formed so as to be highest at a portion projecting from an end surface of the stator core 12a. The amount by which the conductor 18 is shifted in the radial direction D2 may be set to any amount. If the amount of shifting is substantially equal to a width Wd of the conductor 18, the plurality of conductors 18 can be more easily shifted in the radial direction D2. The conductor 18 may be configured such as not to have the stepped shape. Instead, the conductor 18 may only have the crank portion 14c that is bent into a crank shape.

A terminal T, such as that indicated by the double-dotted chain lines in FIG. 3, is provided in some of the end portions 14a. Connection between end portions 14a, and connection between the end portion 14a and the terminal T are preferably made by joining, such as by soldering or welding. Welding includes fusion welding (such as gas welding, arc welding, electro-slag welding, electron-beam welding, and laser-beam welding), and pressure welding (such as resistance welding and forge welding).

Figure 4:
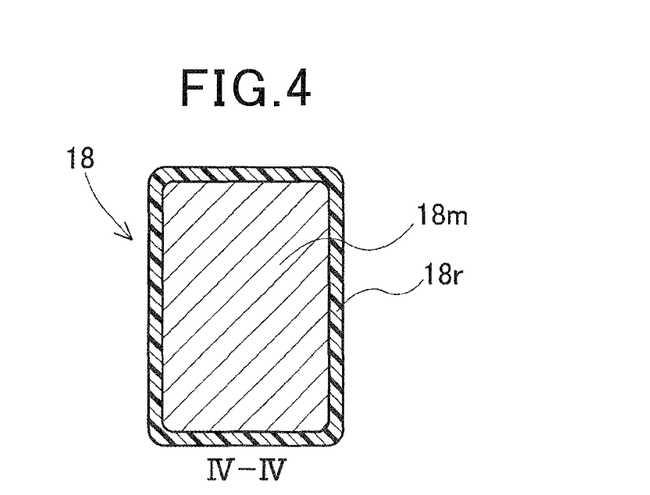
FIG. 4 is a cross-sectional view of the example of a configuration of the conductor, taken along line IV-IV in FIG. 3.

FIG. 4 shows a cross-sectional view of the conductor 18, taken along line IV-IV in FIG. 3. The turn portion 14 and the slot-housed portion 19 of the conductor 18 are composed of a conductive metal member 18m (such as a copper wire) that is coated by an insulating film 18r (such as a resin) to ensure insulation. On the other hand, the end portion 14a of the conductor 18 is not coated with the insulating film. The metal member 18m of the end portion 14a is exposed to enable connection.

As shown in FIG. 5, the conductors 18, such as that described above, are housed so as to be successively inserted into the series of slots 12b, in adherence to a predetermined order of placement. The conductors 18 are stacked for each phase, or in other words, a U-phase, a V-phase, and a W-phase. As a result, a coil winding is formed that winds around the stator core 12a. The coil winding connects between the end portions 14a and connects the end portions 14a and the terminals T. The coil winding is also formed so as to form any of a Y-connection (star connection), a Δ (delta) connection, or a mixed Y-Δ connection.

Figure 6:
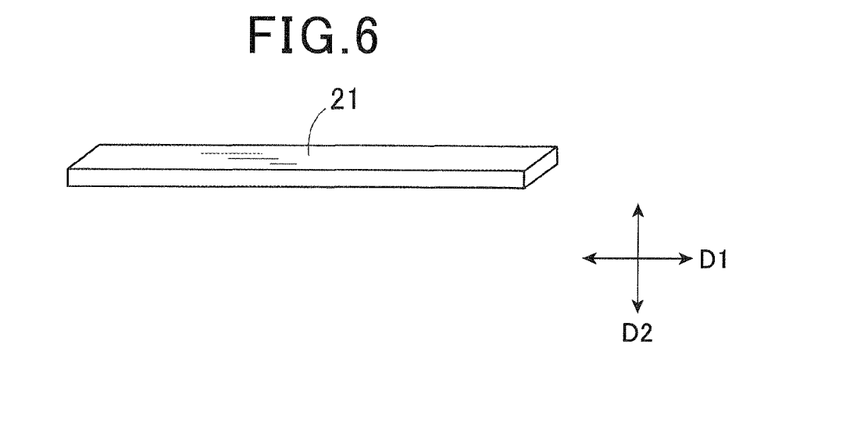
FIG. 6 is a perspective view of a wedge that does not have a notch.

As shown in FIG. 5, wedges 21 are provided within each slot 12b, excluding any single slot 12b. The wedges 21 are fitted into both ends of the arrayed conductors 18 (four conductors 18 in the present example) that are stacked in the radial direction D2 and housed in the slot 12b. As shown in FIG. 6, the wedge 21 is a strip-shaped plate member. The width of the wedge 21 has the same dimension as the width Wd of the conductor 18. The length of the long side of the wedge 21 has the same dimension as the length of the slot-housed portion 19 of the conductor 18. A plate thickness of the wedge 21 is set to an appropriate dimension such that a gap is not formed in the slot 12b, based on the difference between the depth dimension of the slot 12b and the length dimension of the arrayed conductors 18.

The wedge 21 is preferably formed by a synthetic resin material. Applicable synthetic resins may be general-purpose resins, such as thermoplastic vinyl chloride resin and acrylonitrile butadiene styrene (ABS) resin. However, vehicles and the like in which the rotating electric machine 10 is often mounted have harsh ambient temperatures and load conditions. The temperature of the rotating electric machine 10 tends to become high. Therefore, super engineering plastics capable of withstanding an environment that is 150° C. or higher for extended periods, such as polyphenylene sulfide (PPS) and polyetheretherketone (PEEK), are more preferably used.

Any single slot 12b is also provided with the same wedge 21 that is provided in the other slots 12b. The wedge 21 is provided between a radial-direction wall surface 12b1 of the slot 12b forming an opening portion of the slot 12b on the inner-diameter side of the stator 12 and an end surface 181 of the arrayed conductors 18 that opposes the radial-direction wall surface 12b1.

On the other hand, instead of the wedge 21 that is the same as those in the other slots 12b, a wedge 21a is provided between a radial-direction wall surface 12b2 of the slot 12b forming a bottom portion of the slot 12b on the outer-diameter side of the stator 12 and the other end surface 182 of the arrayed conductors 18 that opposes the radial-direction wall surface 12b2. The wedge 21a may be provided between the end surface 181 of the arrayed conductors 18 and the opening portion of the slot 12b, instead of the bottom portion of the slot 12b.

Figure 7:
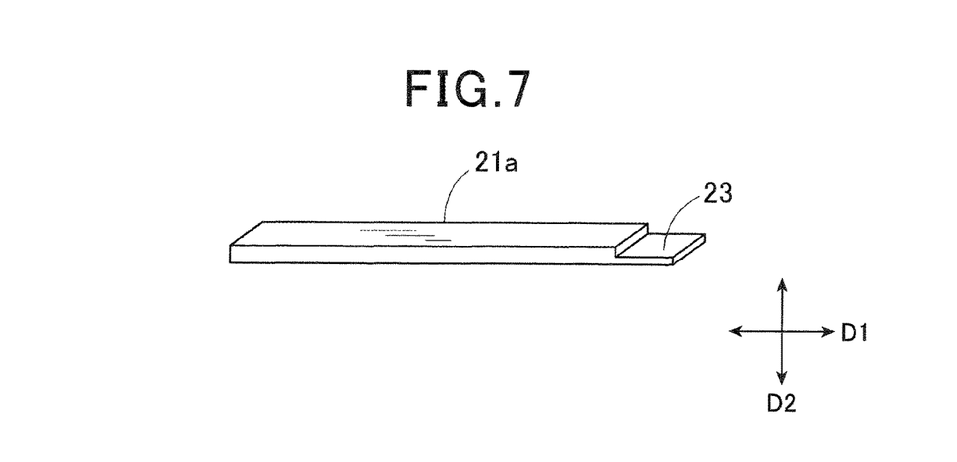
FIG. 7 is a perspective view of a wedge that has a notch.

As shown in FIG. 7, the wedge 21a is the wedge 21 that is provided with a notch 23. The notch 23 is provided in the end portion of the wedge 21a in the long direction. The notch 23 opens to the axial-direction end surface of the stator 12. In FIG. 7, the notch 23 is shown having a stepped shape. However, the shape and dimensions of the notch 23 can be variously changed depending on the outer shape of a temperature sensor 22 to be disposed in the notch 23. The notch 23 may also be a groove. Alternatively, the notch 23 may be a through hole or a punched hole.

The temperature sensor 22 that is attached to the notch 23 is preferably compact and capable of being housed in the notch 23. For example, although detection principles differ, a thermistor or a thermocouple can be favorably used as the temperature sensor 22.

The rotating electric machine 10 configured as described above operates in a following manner. In FIG. 1, the stator 12 is magnetized based on a drive electric current. The drive electric current has been supplied from the power converter 30 and power-converted. As a result of the magnetization, rotation torque (including when motive power is generated) is generated. The rotor 13 rotates. In this instance, the rotating electric machine 10 operates as a motor. The generated rotation torque is outputted to a rotating body (such as wheels or propellers) via the rotor 13 and the rotating shaft 20. A power transmission device may be interposed between the rotating shaft 20 and the rotating body. The power transmission device includes one or more of a shaft, a cam, a rack and pinion, a gear, and the like.

In an instance in which the power converter 30 does not output power conversion signals and the rotating body generates rotation force (including motive power), the rotor 13 receives the rotation force of the rotating body and also rotates. Therefore, counter-electromotive force is generated in the conductors 18 of the stator 12. The generated counter-electromotive force (regenerative power) can be used to charge a battery via the power converter 30. In this instance, the rotating electric machine 10 operates as a power generator.

As described above, regardless of whether the rotating electric machine 10 is operating as a motor or a power generator, the conductors 18 of the stator 12 are energized and generate heat. The temperature sensor 22, provided between the wall surfaces of the slot 12b and the conductors 18, is capable of accurately measuring the temperature of the conductors 18.

As is clear from the detailed description above, in the stator 12 of the rotating electric machine 10 according to the first embodiment, the slots 12b are formed such that the conductors 18 are housed and arrayed. The stator 12 also includes the temperature sensor 22 that is disposed within the slot 12b. Therefore, the temperature sensor 22 is not affected by drafts of cooling air and the like. An excellent effect is achieved in that the temperature sensor 22 is capable of accurately detecting the temperature of the coil winding.

In addition, the temperature sensor 22 is provided in the wedge 21a that is fitted into the slot 12b. Therefore, placement of the temperature sensor 22 is very easy. In addition, the wedge 21a is fitted between the conductors 18 and the slot 12b. Therefore, attachment space for the temperature sensor 22 can be ensured without reducing the space factor of the conductors 18 within the slot 12b.

In addition, the temperature sensor 22 is disposed in the notch 23 provided in the wedge 21a. Therefore, placement of the temperature sensor 22 is very easy. In addition, the temperature of the conductors 18 can be accurately detected.

Furthermore, the wedge 21a is provided between a radial-direction end surface 182 of the arrayed conductors 18 and the opposing radial-direction wall surface 12b2 of the slot 12b. Therefore, placement of the temperature sensor 22 is very easy. In addition, the temperature of the conductors 18 can be accurately detected.

Variation Example of the First Embodiment

Next, a configuration using a slot 12c that is a variation example of the slot 12b will be described with reference to FIG. 8.

In the first embodiment, as shown in FIG. 5, the axial-direction cross-section of the slot 12b has a rectangular shape that is elongated in the radial direction D2. Teeth 12d are formed between adjacent slots 12b. Each tooth 12d has a trapezoidal shape of which the upper base has a width W1 and the lower base has a width W2.

Figure 8:
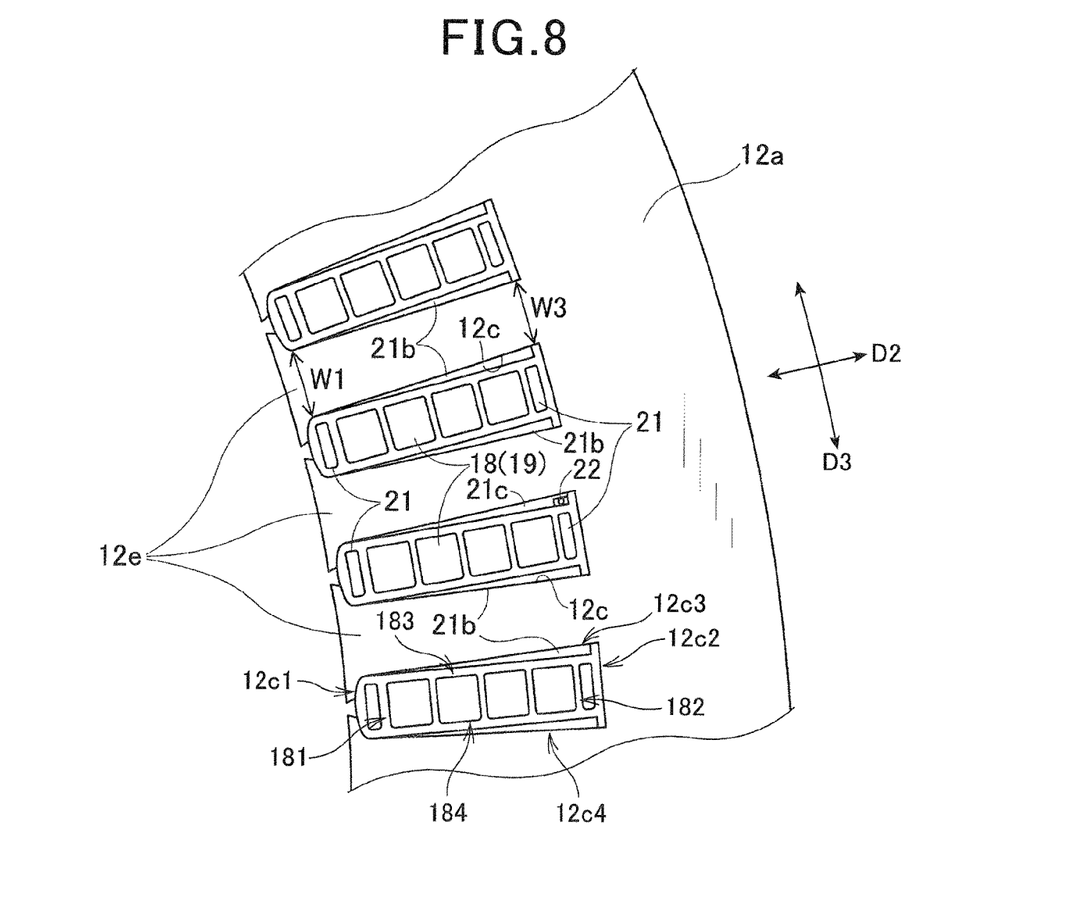
FIG. 8 is a detailed planar view showing a portion of a stator having slots in a variation example according to the first embodiment.

On the other hand, in the present example, as shown in FIG. 8, the axial-direction cross-section of the slot 12c has a trapezoidal shape. Teeth 12e are formed between adjacent slots 12c. Each tooth 12e has a rectangular shape of which the short side on the inner-diameter side of the stator core 12a has the width W1 and the short side on the outer-diameter side of the stator core 12a has a width W3. In other words, the width W2 transitions to the width W3 that has a smaller width dimension. The width W3 and width W1 have the same dimension. In addition, the width W3 is merely required to meet a condition that it is a width sufficient for the temperature sensor 22 to be inserted. Therefore, any width W3 may be set within a range of W1<W3<W2.

In this instance, a cross-sectional area of a magnetic circuit of the tooth 12e is the smallest at the width W1 section. The cross-sectional area is the same as that of the tooth 12d. Therefore, the magnetic circuit is not affected by the width W3 being smaller than the width W2. Rather, sections unnecessary in terms of the magnetic circuit are eliminated. Therefore, the stator core 12a can be made thinner. This contributes to weight reduction of the rotating electric machine 10.

A wedge 21b is fitted into a wedge-shaped space formed between long-side walls (circumferential-direction wall surfaces 12c3, 12c4) of each slot 12c, excluding one long-side wall (one circumferential-direction wall surface 12c3) of any single slot 12c, and both circumferential-direction side surfaces 183, 184 of the arrayed conductors 18. In FIG. 8, the wedges 21 are disposed between both side surfaces 181, 182 of the arrayed conductors 18 and both radial-direction wall surfaces 12c1, 12c2 of the slot 12c forming the bottom portion of the slot 12c on the outer-diameter side of the stator 12. However, the wedge 21 may be disposed on only either of end surfaces 181, 182 of the arrayed conductors 18. Alternatively, the wedge 21 may not be disposed on either end surface 181, 182 of the arrayed conductors 18.

Figure 9:
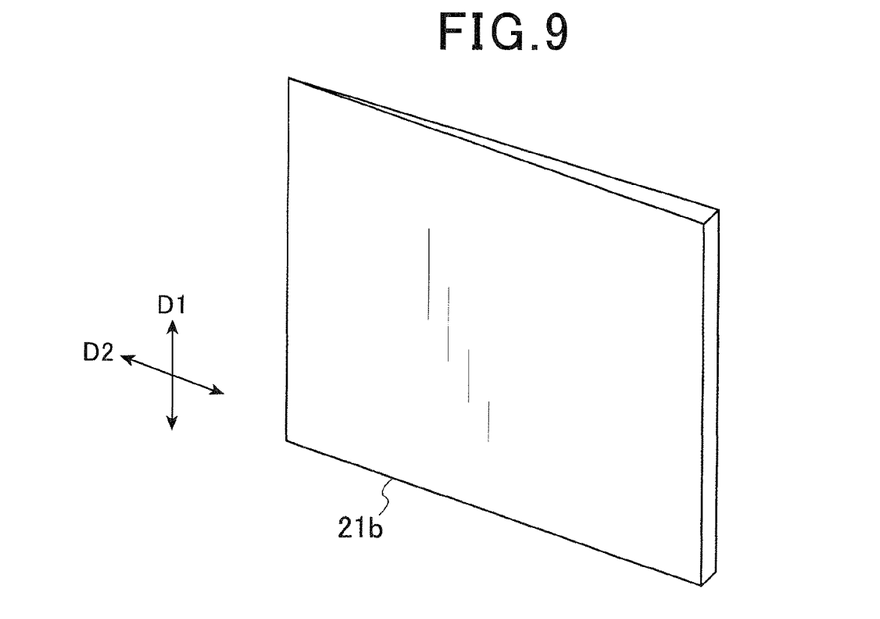
FIG. 9 is a perspective view of a wedge that does not have a notch that is fitted into the slot in the variation example according to the first embodiment.

As shown in FIG. 9, the wedge 21b is a wedge-shaped plate member having a shape that is substantially similar to the shape of the wedge-shaped space. The material of the wedge 21b is the same as that of the wedge 21, described above. Therefore, description thereof is omitted.

A wedge 21c is fitted into the wedge-shaped space between one long-side wall (one circumferential-direction wall surface 12c3) of any single slot 12c and one circumferential-direction side surface 183 of the arrayed conductors 18.

Figure 10:
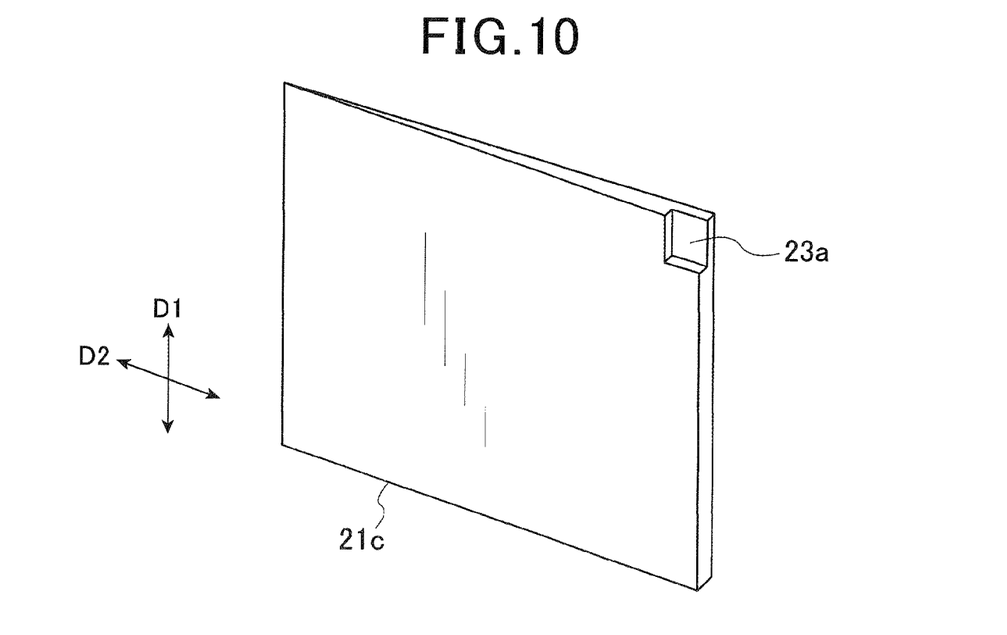
FIG. 10 is a perspective view of a wedge that has a notch that is fitted into the slot in the variation example according to the first embodiment.

As shown in FIG. 10, the wedge 21c is a wedge 21b that is provided with a notch 23a. The notch 23a is provided in any position (a corner portion in FIG. 10) on one end surface of the wedge-shape of the wedge 21c. The notch 23a opens to the axial-direction end surface of the stator 12. In FIG. 10, the notch 23a is shown having a stepped shape. However, the shape and dimensions of the notch 23a can be variously changed depending on the outer shape of a temperature sensor 22 to be disposed in the notch 23a. The notch 23a may also be a groove. Alternatively, the notch 23a may be a through hole or a punched hole.

As is clear from the detailed description above, in the variation example, the wedge 21c is provided between one circumferential-direction side surface 183 of the arrayed conductors 18 and one long-side wall (circumferential-direction wall surface 12c3) of the slot 12c. Therefore, the magnetic circuit is not adversely affected. In addition, unnecessary sections of the magnetic circuit are eliminated. As a result, the stator core 12a becomes thinner. The rotating electric machine 10 becomes lighter in weight.

Second Embodiment

According to the above-described first embodiment, an example is given in which the temperature sensor 22 is provided in the wedge 21a or the wedge 21c. On the other hand, according to a second embodiment, the temperature sensor 22 is disposed as follows. The wedges 21 or 21b are fitted into the slots 12b. In this state, the conductors 18 are fixed by an impregnating process using an insulating resin. The wedges 21 or 21b are then pulled out, thereby forming spaces 24a. The temperature sensor 22 is disposed within the space 24a.

A configuration according to the second embodiment will be described with reference to FIGS. 11 and 12.

Figure 11:
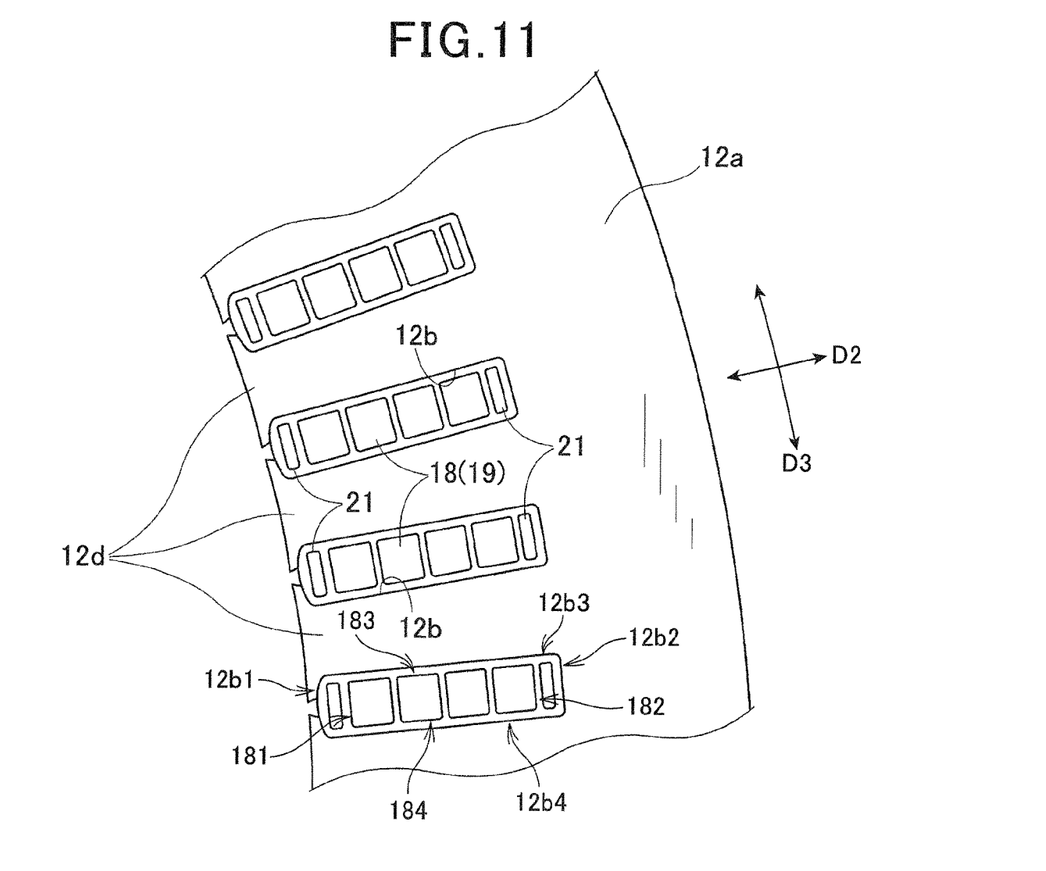
FIG. 11 is a detailed planar view showing a portion of a stator according to a second embodiment, in a state prior to removal of wedges.
Figure 12:
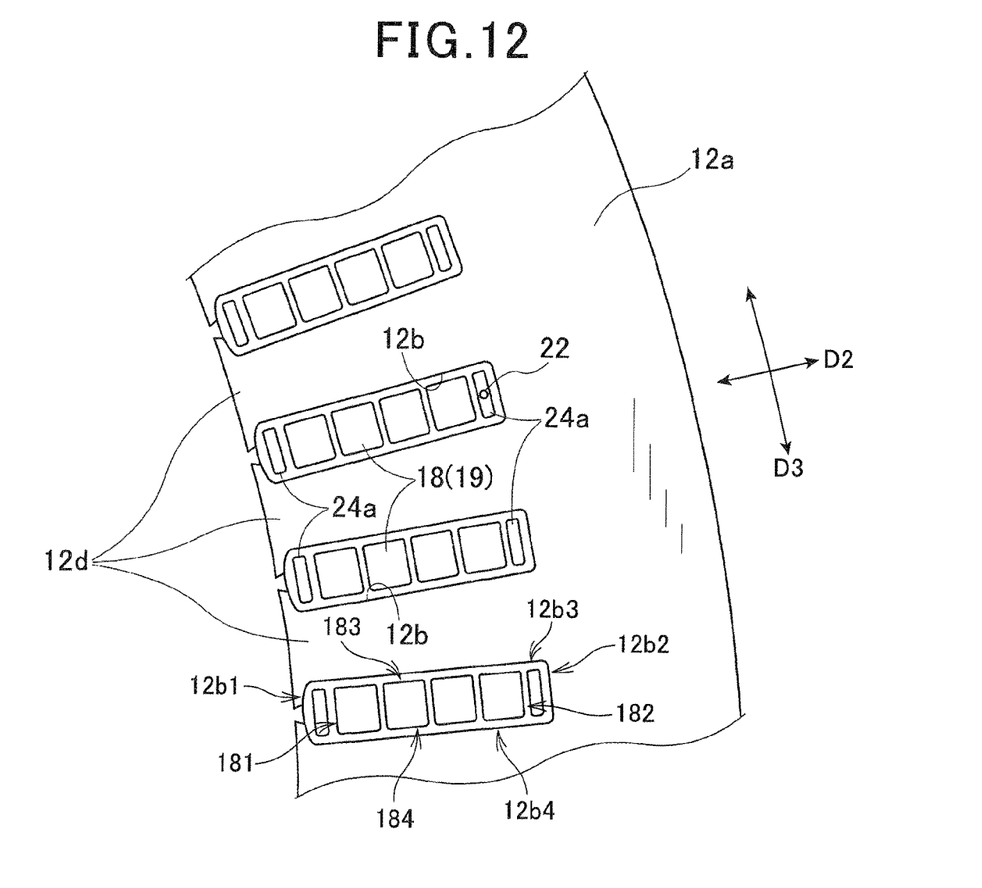
FIG. 12 is a detailed planar view showing a portion of the stator according to the second embodiment.

As shown in FIGS. 11 and 12, the conductors 18 are stacked and arrayed within each slot 12b. The wedges 21 are fitted between the radial-direction end surfaces 181, 182 of the arrayed conductors 18 and the opposing radial-direction wall surfaces 12b1, 12b2 of the slot 12b. However, the wedge 21 may be disposed on only either of the end surfaces 181, 182 of the arrayed conductors 18.

To fix the arrayed conductors 18 within the slots 12b, the impregnating process using an insulating resin, such as varnish, is performed on the wedge 21, together with the arrayed conductors 18. After the impregnating process is performed, the wedge 21 is pulled out. As a result, as shown in FIG. 12, the space 24a is formed in the position in which the wedge 21 had been fitted. The temperature sensor 22 is provided in any single space 24a.

As is clear from the detailed description above, according to the second embodiment, the wedges 21 and 21b are fitted into the slots 12b. In this state, the impregnating process using an insulating resin is performed, thereby fixing the conductors 18. The wedges 21 and 21b are then pulled out, thereby forming the spaces 24a. The temperature sensor 22 is disposed within the space 24a. Therefore, placement of the temperature sensor 22 is very easy. In addition, oil or air can be supplied through the spaces 24a and 24b, thereby cooling the stator 12.

Variation Example of the Second Embodiment

Next, a variation example according to the second embodiment will be described with reference to FIGS. 13 and 14.

Figure 13:
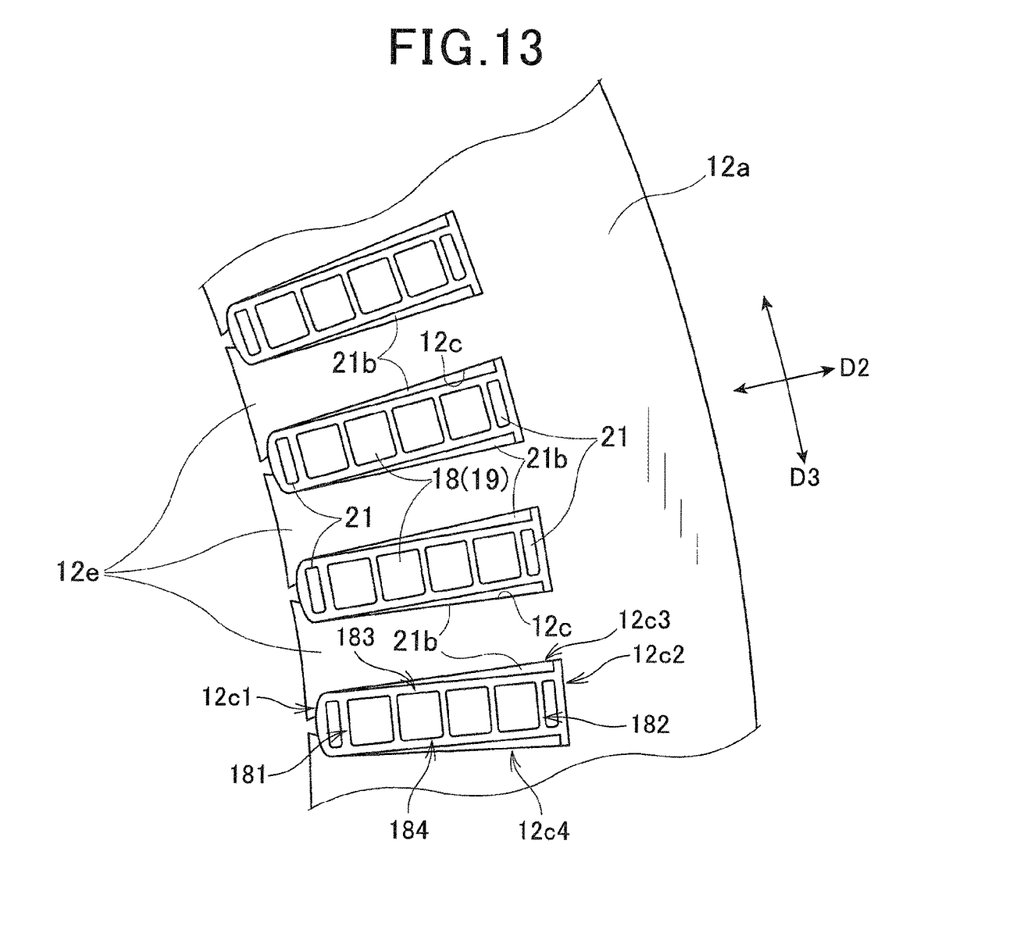
FIG. 13 is a detailed planar view showing a portion of a stator in a variation example according to the second embodiment, in a state prior to removal of wedges from a stator having slots.
Figure 14:
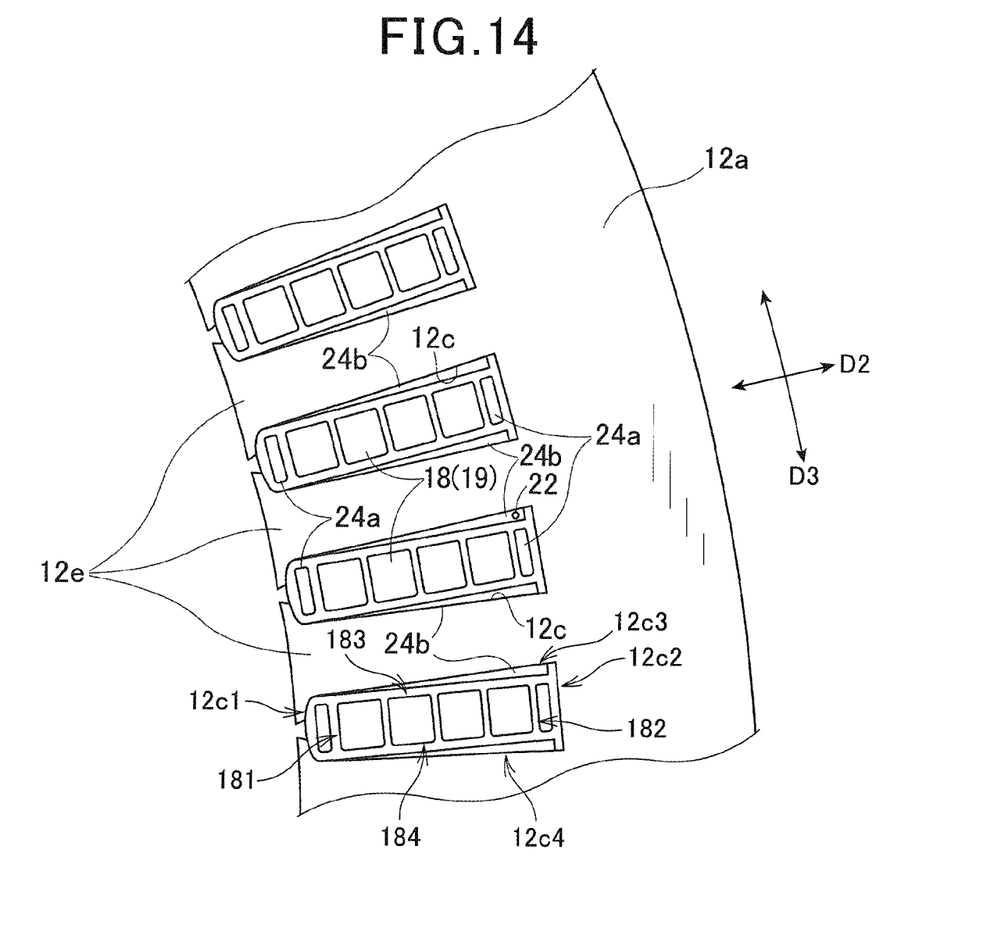
FIG. 14 is a detailed planar view showing a portion of the stator having slots in a variation example according to the second embodiment

As shown in FIG. 13, the conductors 18 are stacked and arrayed within each slot 12c. The wedges 21b are fitted between the circumferential-direction side surfaces 183, 184 of the arrayed conductors 18 and the circumferential-direction wall surfaces 12c3, 12c4 of the slots 12c. In addition, the wedges 21 are fitted between the radial-direction end surfaces 181, 182 of the arrayed conductors 18 and the opposing radial-direction wall surfaces 12c1, 12c2 of the slot 12c. However, the wedge 21 may be disposed on only either of the end surfaces 181, 182 of the arrayed conductors 18. In addition, the wedge 21 may not be disposed on either end surface 181, 182 of the arrayed conductors 18.

To fix the arrayed conductors 18 within the slots 12c, the impregnating process using an insulating resin, such as varnish, is performed on the wedges 21 and 21b, together with the arrayed conductors 18. After the impregnating process is performed, the wedges 21 and 21b are pulled out. As a result, as shown in FIG. 14, the spaces 24a and 24b are formed in the positions in which the wedges 21 and 21b had been fitted. The temperature sensor 22 is provided in any single space 24a or 24b.

As is clear from the detailed description above, in the variation example according to the second embodiment, effects similar to those described above according to the second embodiment can be achieved.

The present invention includes examples that have been variously modified, corrected, improved, and the like based on one of skill in the art. In addition, examples that have been variously modified and the like are included in the scope of the present invention without departing from the spirit of the present invention.

What is claimed is:

1. A stator comprising:
a stator core in which a plurality of slots are arranged in a circumferential direction of the stator;
a winding that is configured by a plurality of conductors, each of the conductors including a slot-housed portion that is housed in each of the slots and a coil end portion that projects from an end surface of each of the slots in an axial direction of the stator, the winding being stacked and arrayed in a radial direction of the stator;
a plurality of wedges that are fitted into the slots and provided between one of two circumferential-direction wall surfaces of each of the slots and a circumferential-direction end surface of the arrayed conductors facing the one of two circumferential-direction wall surfaces of each of the slots; and
a temperature sensor that is provided in at least one of the wedges so that the temperature sensor is circumferentially between (i) all of slot-housed portions of the arrayed conductors housed in the slot into which the at least one of the wedges is fitted and (ii) the one of two circumferential-direction wall surfaces of the slot into which the at least one of the wedges is fitted; wherein:
the at least one of the wedges includes a radially outer portion and a radially inner portion;
the radially outer portion is thicker than the radially inner portion and has a notch provided in a corner of the radially outer portion; and
the temperature sensor is disposed in the notch.

2. The stator according to claim 1, wherein:
a wedge-shaped space is formed between one of two circumferential-direction wall surfaces of each of the slots and a circumferential-direction end surface of the arrayed conductors facing the one of two circumferential-direction wall surfaces of each of the slots; and
each of the wedges is a wedge-shaped plate member having a shape that is substantially similar to a shape of the wedge-shaped space.

3. A rotating electric machine comprising:
a stator; and
a rotor that opposes the stator in a rotatable manner,
the stator including:
- a stator core in which a plurality of slots are arranged in a circumferential direction of the stator;
- a winding that is configured by a plurality of conductors, each of the conductors including a slot-housed portion that is housed in each of the slots and a coil end portion that projects from an end surface of each of the slots in an axial direction of the stator, the winding being stacked and arrayed in a radial direction of the stator;
- a plurality of wedges that are fitted into the slots and provided between one of two circumferential-direction wall surfaces of each of the slots and a circumferential-direction end surface of the arrayed conductors facing the one of two circumferential-direction wall surfaces of each of the slots; and
- a temperature sensor that is provided in at least one of the wedges so that the temperature sensor is circumferentially between (i) all of slot-housed portions of the arrayed conductors housed in the slot into which the at least one of the wedges is fitted and (ii) the one of two circumferential-direction wall surfaces of the slot into which the at least one of the wedges is fitted; wherein:

the at least one of the wedges includes a radially outer portion and a radially inner portion; and
the radially outer portion is thicker than the radially inner portion and has a notch provided in a corner of the radially outer portion; and
the temperature sensor is disposed in the notch.

4. The rotating electric machine according to claim 3, wherein:
- a wedge-shaped space is formed between one of two circumferential-direction wall surfaces of each of the slots and a circumferential-direction end surface of the arrayed conductors facing the one of two circumferential-direction wall surfaces of each of the slots; and
- each of the wedges is a wedge-shaped plate member having a shape that is substantially similar to a shape of the wedge-shaped space.

* * * * *